United States Patent [19]
Kubota

[11] Patent Number: 5,552,094
[45] Date of Patent: Sep. 3, 1996

[54] METHOD FOR PRODUCING A THIN FILM

[75] Inventor: Atsushi Kubota, Susono, Japan

[73] Assignee: General Electric Company, Pittsfield, Mass.

[21] Appl. No.: 296,786

[22] Filed: Aug. 26, 1994

[30]   Foreign Application Priority Data

Aug. 27, 1993   [JP]   Japan .................................. 5-235812

[51] Int. Cl.$^6$ .................................................. B29C 45/56
[52] U.S. Cl. ...................... 264/40.5; 264/2.2; 264/328.7; 425/145; 425/149; 425/150
[58] Field of Search ................................ 264/40.1, 40.5, 264/328.7, 2.2; 425/145, 149, 150

[56]   References Cited

U.S. PATENT DOCUMENTS 4,370,123   1/1983   Dannels et al. .
5,002,706   3/1991   Yamashita .............................. 264/40.5

FOREIGN PATENT DOCUMENTS

| 559392 | 4/1960 | Belgium . | |
|---|---|---|---|
| 0380688 | 8/1990 | European Pat. Off. . | |
| 53-21257 | 2/1978 | Japan .................. | 264/328.7 |
| 60-179216 | 9/1985 | Japan . | |

*Primary Examiner*—Jill L. Heitbrink

[57]   ABSTRACT

A method of producing thin-film products consisting of injecting the molten resin into a die, the internal cavity pressure is momentarily reduced when the internal cavity pressure reaches a prescribed pressure, and closing of the cavity is performed so that the final thickness of the molded product is achieved, and a thin-film molded product produced is produced by said method.

3 Claims, 3 Drawing Sheets

METHOD FOR PRODUCING A THIN FILM

FIELD OF THE INVENTION

The present invention pertains to a method of producing thin film useful for producing a thin-film molded product of synthetic resins, for example, a molded product with a film thickness of less than approximately 1 mm.

BACKGROUND OF THE INVENTION

Synthetic resin, especially, various types of molded products consisting of materials comprised of engineering plastics also referred to as high performance plastics are widely used for many purposes. For example, they are widely used for housings and chassis for small portable machines with notebook or lap-top style. A weight that is as light as possible is required for housings for said types of small machines.

The easiest method to achieve weight reduction in molded resin products is to reduce the thickness of the film. However, in order to produce a thin-film molded product with a thickness of less than 1 mm, for example, it is necessary to perform the injection at a high pressure so that the molten resin injected for the injection cylinder flows within the narrow cavity at a high speed. When the molten material is injected from the nozzle at a high injection pressure, the pressure of the molten material in the cavity is drastically increased, as a result, the parting of the die is opened. When this happens, it is difficult to produce a molded product with the desired thin-film thickness and design.

It is not practical to provide a closing force greater than the prescribed value to eliminate the above a closing force greater than the prescribed value to eliminate the above-mentioned problems from the standpoint of mechanical structure and cost factors. Therefore, application of compression injection molding, in which the gap between the die cavity is set at a value greater than the prescribed thickness, and closing is done while the molten material is being injected to restore the prescribed cavity gap, is conceivable.

As an example, the compression injection molding method disclosed in Japanese Kokai Patent Application No. Sho 60[1995]-110419 (applicant, Idemitsu Petrochemicals, Ltd.), etc., can be mentioned. However, in a high performance molding that achieves adequate physical properties even when the thickness of the film is low, that is, upon molding of engineering plastics, closing is inhibited due to the internal cavity pressure generated at the final filling stage, especially at the time of production of a thin-film molded product with a film thickness less than 1 mm, and a greater closing force is required; as a result, it is difficult to produce a film with the prescribed thickness.

The objective of the present invention is to eliminate the above-mentioned problems with the conventional method, and to provide a method of producing a thin film capable of producing a molded product consisting of a thin film with a uniform thickness form engineering plastics.

The objective of the invention is to provide a method of producing thin-film molded products that produces a uniform thin-film molded product with highly reproducible properties form high performance plastic resins.

SUMMARY OF THE INVENTION

The problem described above can be eliminated by using a method of producing a thin film consisting of injecting the molten resin into the die, and filling of the molten resin is completed as the cavity of the die is opened wider than the final thickness of the molded product as the closing process continues, and momentarily reducing the internal pressure in the cavity as the internal pressure of the cavity reaches the prescribed range while the closing process is further continued, and the closing process in continued until the dimensions of the cavity become the final thickness of the molded product; in the method of producing a thin film used in the manufacture of thin-film molded products with a high performance, injection of the resin is started as the closing progresses to the point where interference in anticipated, and closing of the die is continued.

DETAILED DESCRIPTION OF THE INVENTION

According to the method of producing the thin film of the present invention, the injection of the molten material is started while the opening of the gap of the die cavity is slightly greater than the desired final thickness of the molded product, and closing is continued even after the injection is competed. In this case, a decrease in the temperature of the resin at the area in contact with the cavity surface of the die begins to occur, but the flow state is still maintained within the resin, and the internal cavity pressure further is increases as the space in the cavity is decreased.

When the internal cavity pressure reaches 200 to 300 kg/cm$^2$, which is approximately half of the standard value of the internal cavity pressure during standard injection molding, or sensor installed at approximately 70–80% of the flow distance of the standard filling, The internal cavity pressure is momentarily reduced by withdrawal of the screw, or removal of the pressure. As a result of the pressure drop described above, the resin in the inner core layer that is capable of flowing undergoes a back flow, and the unnecessary increase in internal cavity pressure can be prevented.

As a result, excessive closing force is not required at the final stage of the closing that forms the desired film thickness. Therefore, according to the method of producing the thing film of the present invention, excessive closing force is not required, and a thin-film molded product with an accurate film thickness can be produced.

Whether the internal pressure of cavity reaches the prescribed pressure range or not can be confirmed by checking whether the internal cavity pressure near the gate has reached 200–300 kg/cm$^2$, or by the detection of the internal cavity pressure by a pressure sensor installed at 70–80% of the flow distance of the molded product.

Figure 1:
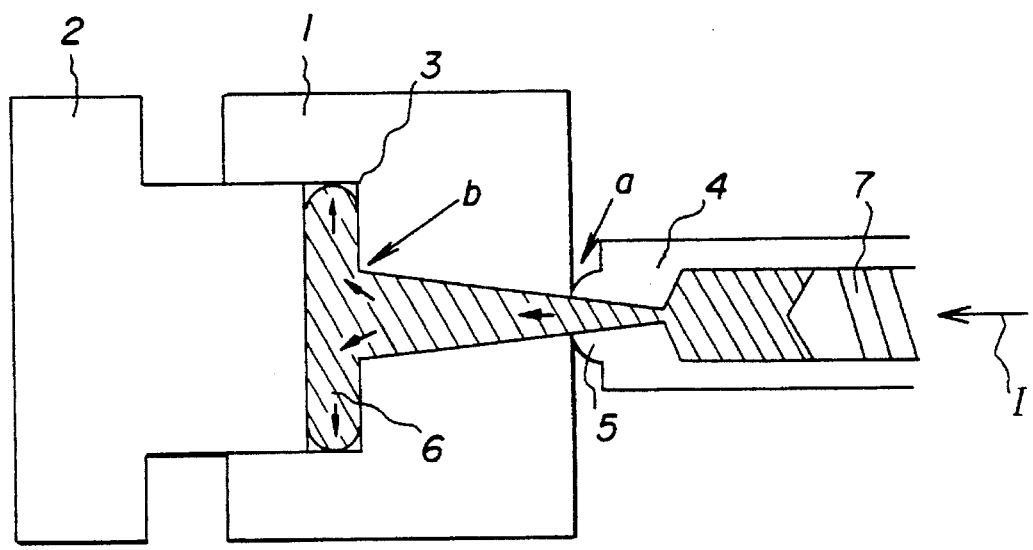
FIG. 1 is an explanatory diagram that shows the structure of the die and the injection cylinder used for production of the thin-film molded product of the present invention.
Figure 2:
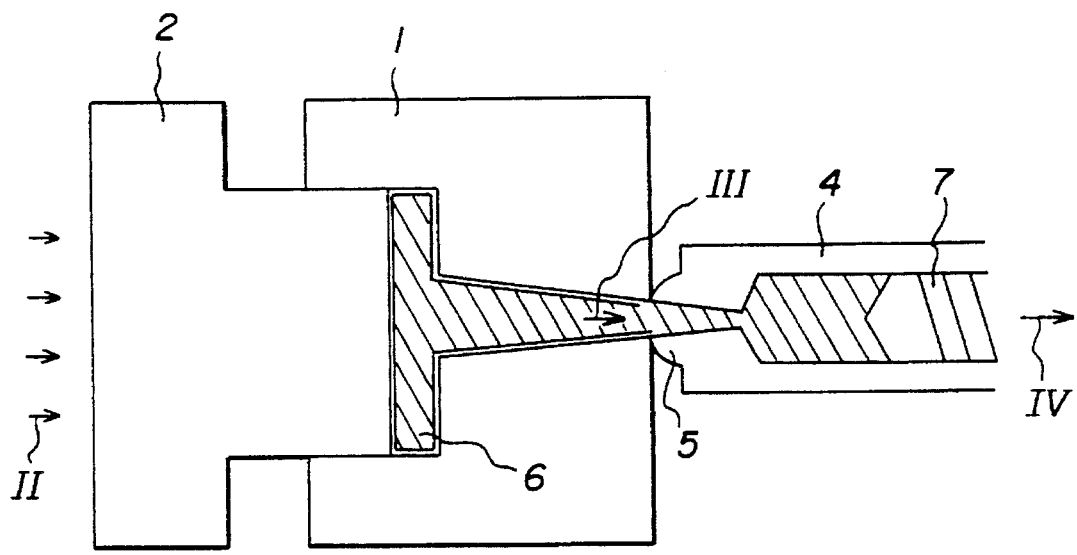
FIG. 2 is an explanatory diagram that shows the structure of the die and the injection cylinder used for production of the thin-film molded product of the present invention.

In the following, the present invention is disclosed using the attached drawing that show the application examples. FIG. 1 and FIG. 2 are model diagrams of dies used for practicing the method of producing a thin film of the present invention. In FIG. 1, molten material 6 is injected form the tip of nozzle 5 of the injection cylinder 4 into cavity 3 formed between stationary die 1 and movable die 2 to produce the desired molded product.

In the injection cylinder 4, a common pressure unit 7, such as a screw or plunger is used. In this case, in FIG. 1, the pressure is applied in the direction I indicated by the arrow, and injection of the molten material 6 is accomplished. Then, closing is performed by moving moveable die 2 in direction II indicated by the arrows in FIG. 2, and the desired thickness of the molded thin-film product can be achieved.

Figure 3A:
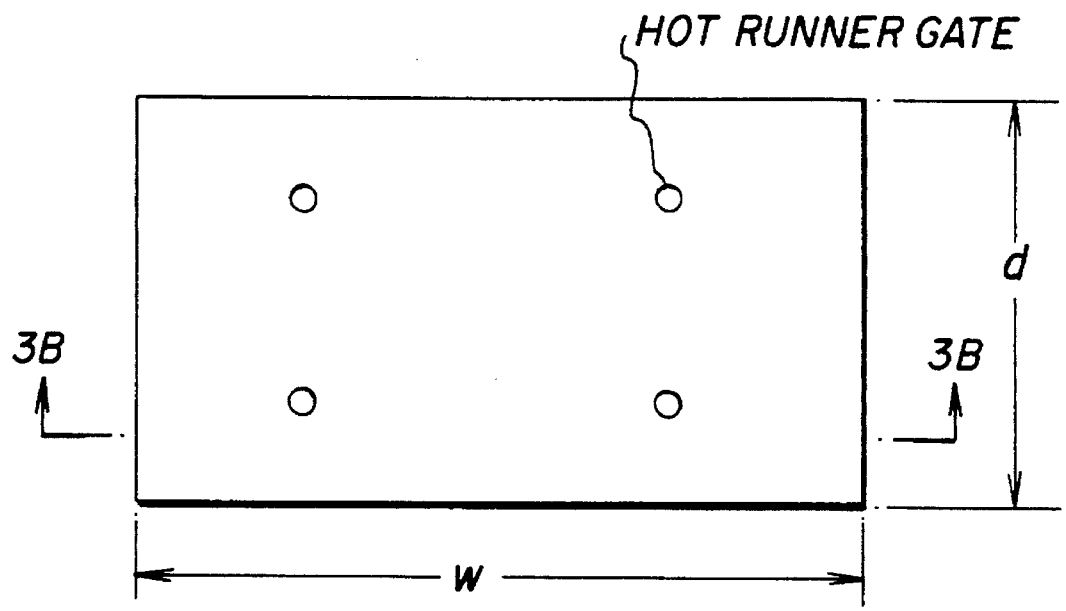
FIG. 3 is a perspective view that shows an example of the molded product produced by the method of producing a thin-film of the present invention.
Figure 3B:
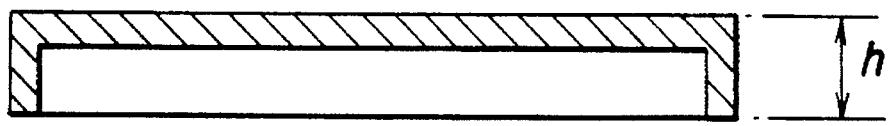

FIG. 3 shows an example of the molded product produced by the application examples of the method of producing the thin film of the present invention. the molded product is a box-form molded product with a 250×180 rectangle base with a thickness of 0.8 mm, and injection of the molten is material was accomplished through hot runner gates at 4 points.

Figure 4:
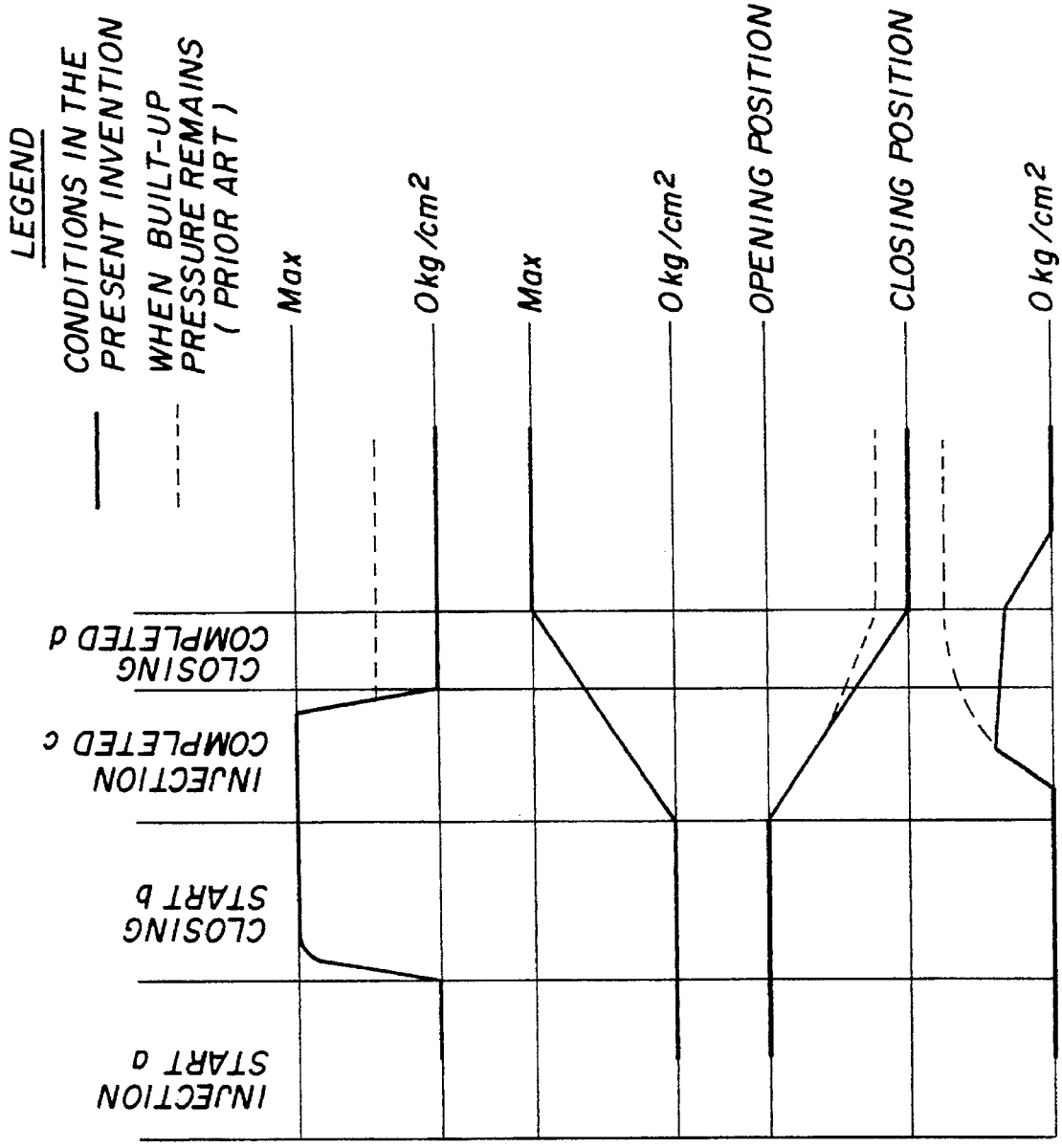
FIG. 4 is a time chart that shows the operation state of each of the components in the method of producing the thin film of the present invention.

FIG. 4 is a time chart that exhibits a change in each area in the method of producing the thin film of the present invention. In the following, the operation is explained in comparison to the major structure shown in FIG. 2.

According to the time chart shown in FIG. 4, in the method of producing the thin film of the present invention, the thermoplastic resin molten material in the injection molding machine, which is not shown in the figure, is injected into the die in which the space in the cavity has been expanded ahead of time ( injection starting time a).

Subsequently, the hydraulic pressure used for applying pressure to screw 7 in the injection machine ramps up to the set value, but the internal cavity pressure does not increase suddenly since the molten resin 6 flows inside the resin. Before the prescribed amount of the molten material 6 is filled inside the cavity, the moveable die 2 s moved forward in the direction II of the arrows, and the process referred to as closing(start of closing b) is performed, and the cavity gap is decreased to the prescribed thickness.

For this reason, the cavity pressure in the die gradually increases, and at the time when the internal cavity pressure increases to approximately 200–300 kg/cm$^2$, supply of the hydraulic pressure to the injection cylinder is terminated, and hydraulic pressure is supplied in the opposite direction to move the screw in direction IV(injection completion c). As a result, the closing force against the die overcomes the pressure within the cavity, and excess molten material within the cavity flows back toward the injection cylinder through the gates.

Closing is further continued, and the die is completely closed (closing completed d), and the pressurized injection process is achieved. For this reason, the internal cavity pressure gradually decreases along with shrinkage of the resin associated with the decrease in temperature, and eventually it becomes zero.

For the method described above, it is desirable to use a die having an open type hot chip, in which temperature control, especially around the gate area, is possible. When said die is used, backflow of the molten material from the gate toward the injection cylinder can be achieved smoothly, and in this application example, a thin-film molded product with a uniform thickness of 0.8 mm was achieved despite having a film thickness of less than 1 mm.

According to the method of producing the thin film of the present invention, it is possible to produce a uniform molded product with a thin-film thickness of 1 mm when the cavity in the die is decreased while injecting the molten material in to the cavity in a pressurized injection-molding system.

According to the method of producing the thin film of the present invention, in order to prevent a sudden increase in the internal cavity pressure during the final stage of closing, excess molten material, which is capable of flowing at this stage, flows back toward the injection cylinder through the gates under the conditions described above. As a result, excess closing force is not required and a thin-film molded product with a relatively large size can be produced in a molding machine with a relatively low closing force.

What is claimed is:

1. A method of producing a thin film having a desired thickness, comprising the steps of:

(A) injecting molten resin at a first injection pressure into a cavity formed between a stationary die and a moveable die with the movable die positioned so that the cavity is opened wider than the desired thickness of the thin film; and (B) closing the dies by moving the movable die toward the stationary die so that the cavity reaches the desired thickness and reducing the injection pressure to allow backflow of the molten resin from the cavity during the closing.

2. The method of claim 1, further comprising monitoring internal pressure within the cavity and wherein step (A) is discontinued when internal pressure within the cavity is between 200 kg/cm$^2$ to 300 kg/cm$^2$.

3. The process of claim 1, wherein the desired thickness of the film is less than 1 millimeter.

* * * * *